United States Patent [19]

Sklaroof

[11] 3,757,195

[45] Sept. 4, 1973

[54] ISOLATED TWO-WIRE SIGNAL TRANSMITTER

[75] Inventor: Morton Sklaroof, Philadelphia, Pa.

[73] Assignee: Honeywell Inc., Minneapolis, Minn.

[22] Filed: Aug. 11, 1972

[21] Appl. No.: 279,987

[52] U.S. Cl. .......................... 321/2, 330/10, 340/210

[51] Int. Cl. .......................... H02m 5/40

[58] Field of Search .......................... 321/2; 330/10; 340/210

[56] References Cited

UNITED STATES PATENTS

| | | | |
|---|---|---|---|
| 3,051,933 | 8/1962 | Cressey et al. | 340/210 X |
| 3,455,162 | 7/1969 | Michener et al. | 340/210 |
| 3,483,476 | 12/1969 | Kobayashi et al. | 330/10 |
| 3,503,261 | 3/1970 | Riester et al. | 340/210 |
| 3,517,556 | 6/1970 | Barker | 340/210 |
| 3,560,948 | 2/1971 | Inose et al. | 340/210 X |
| 3,562,729 | 2/1971 | Hurd | 340/210 |
| 3,573,599 | 4/1971 | Rose | 330/10 X |
| 3,573,774 | 4/1971 | Olsen | 340/210 X |
| 3,581,184 | 5/1971 | Hurd | 321/2 |

*Primary Examiner*—William M. Shoop, Jr.
*Attorney*—Arthur H. Swanson et al.

[57] ABSTRACT

There is disclosed a process variable signal transmitter system which features a two-wire transmission line yet provides conductive isolation between the transmitter, the power source and the utilization device. The transmitter is powered from a power supply link which is transformer coupled to the power source. The power supply link includes a current transformer to couple a modulated data signal to an output circuit.

4 Claims, 2 Drawing Figures

ISOLATED TWO-WIRE SIGNAL TRANSMITTER

The present invention relates to signal transducer/-transmitter, and more particularly to an isolater circuit for use with such signal transducer/transmitters.

In the art relating to industrial process controls, some process variable, such as temperature, is sensed and converted to a representative electrical signal. The resulting electrical signal is then transmitted to a control station where the process variable signal is operated upon to produce a desired control signal. That control signal is then applied back to a control element in the process in such a way as to effect a desired control over the process. In practice, the transducer/transmitter combination might be separated from the control station by a substantial distance such as a mile or more. With such distance between the transmitter and the control station, it is highly desirable that the interconnection between them be a two-wire transmission line. Such a two-wire transmitter is shown in U.S. Pat. No. 3,562,729 — Hurd.

On many occasions, it is desirable, or even necessary, that the output of the transmitter be conductively isolated from the utilization apparatus or any other remotely grounded circuit component. An isolation means for such transmitters is shown in Hurd U.S. Pat. No. 3,581,184 and in Kobayaski et al., U.S. Pat. No. 3,483,476. In the first of these two last mentioned patents, in the form there shown, a separate power supply is required for the system. The Kobayaski et al., patent is representative of transmitters which are both isolated and provide two-wire transmission. In that class of transmitters, there has, heretofore, been included a local oscillator to provide means whereby isolation may be accomplished by transformer coupling. That arrangement, of course requires that, for isolation, a special isolated transmitter be provided. Such arrangements therefore necessitate the provision of two classes of transmitters, those which provide isolation and are more expensive, and those which do not provide isolation and are less expensive.

It is an object of the present invention to provide an improved, isolated two-wire transmission system.

It is another object of the present invention to provide an improved isolated two-wire transmission system which obviates the short-comings of the prior art system.

It is a further object of the present invention to provide an improved means for effecting isolation in a two-wire transmission system without necessitating the provision of a special isolated transmitter, per se.

A further object of the present invention is the provision of an isolated two-wire transmission system wherein the isolation is accomplished at the control stations rather than at the transmitter station.

In accomplishing these and other objects, there has been provided, in accordance with the present invention, a two-wire transmission system wherein all of the power for the transmitter is supplied from the control station. However, the energizing current is conductively isolated, in the power supply stage, both from the power source and from the utilization device. Similarly, the intelligence signal is conductively isolated both from the power source and the utilization device.

A better understanding of the present invention may be had from the following detailed description when read in conjunction with the accompanying drawings, in which.

Figure 1:
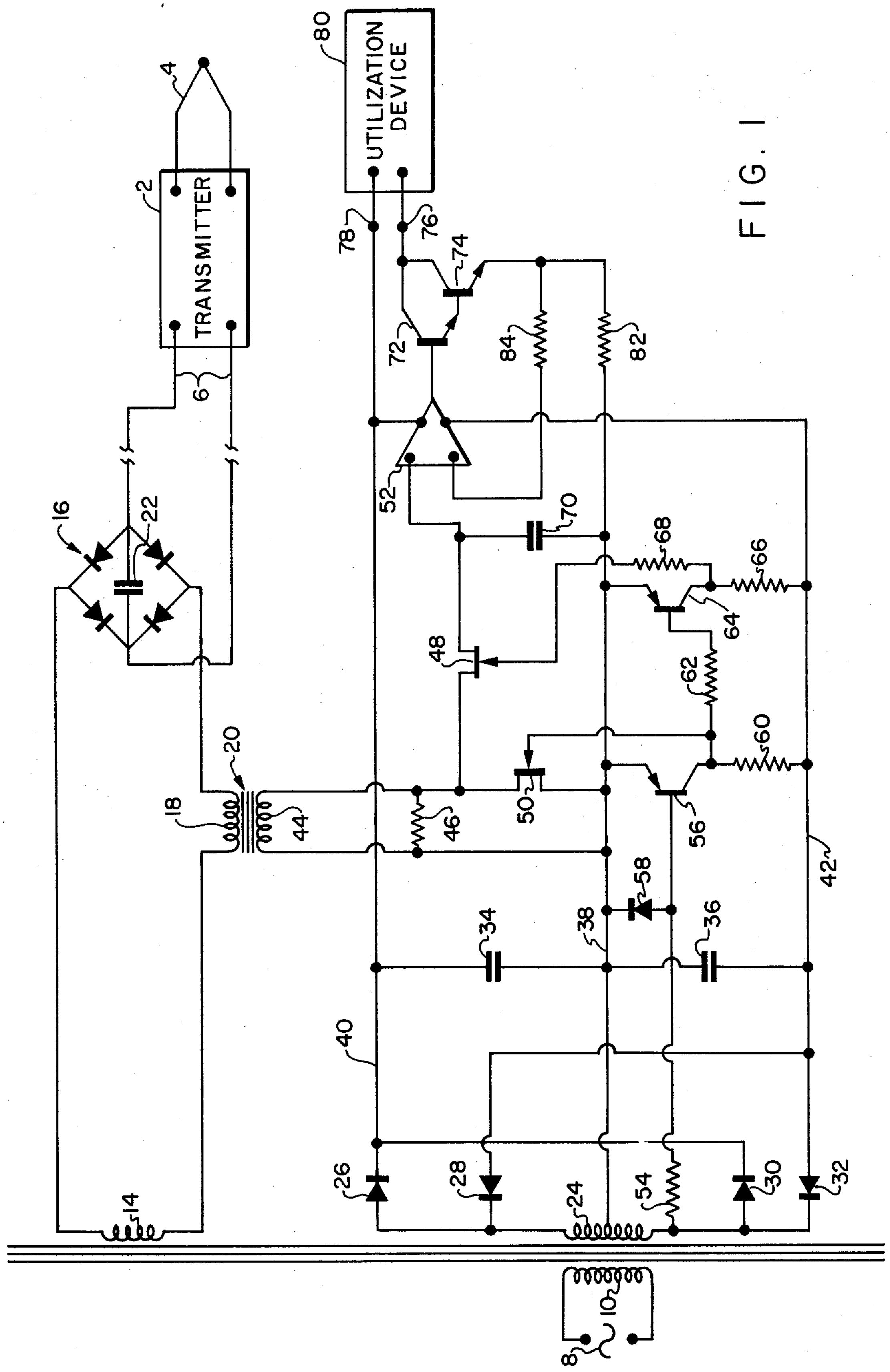
FIG. 1 is a schematic diagram of a circuit embodying the present invention.

Referring now to the drawings in more detail there is shown in FIG. 1 a transmitter 2 which may be of a type shown in the aforementioed Hurd U.S. Pat. No. 3,562,729. A process variable sensing element for the transmitter 2 is represented as a thermocouple 4. Both the energizing power for and the data signal transmitted from the transmitter 2 are carried by a pair of transmission lines 6. The transmission lines 6 are illustrated with a broken line to indicate a substantial distance between the transmitter 2 and the remainder of the equipment which may be located at a central control station.

Energizing power for the system is derived from an AC source 8 connected to the primary winding 10 of a transformer 12. A secondary winding 14 on the transformer 12 has one terminal thereof connected to one corner of a rectifying bridge 16. The other terminal of the secondary winding 14 is connected, through the primary winding 18 of a transformer 20, to the opposite corner of the bridge 16. These two corners of the bridge 16 are, of course, the AC terminals of the rectifying bridge. The remaining corners of the bridge 16 are the DC terminals and are connected, respectively, to the transmission lines 6. A filter capacitor 22 is connected across the DC terminals of the bridge for the usual smoothing effect.

A further secondary winding 24 of the transformer 12 is connected to the AC input terminals of a rectifier bridge including the diodes 26, 28, 30, 32. A pair of filter capacitors 34 and 36 are connected, respectively, between the DC terminals of the bridge and a reference lead 38 which is, in turn, connected to a center tap on the secondary winding 24. The positive terminal of this latter bridge is connected to a positive buss 40 while the negative terminal of the bridge is connected to the negative buss 42.

A secondary winding 44 from the transformer 20 has one terminal thereof connected to the reference lead 38. The other terminal of the secondary 44 is connected to the input of a synchronous demodulator. A load resistor 46 is also connected across the terminals of the secondary winding 44.

The synchronous demodulator includes a first and a second field effect transistor (FET) 48, 50, respectively. The first FET 48 is connected in series between the secondary 44 and one input terminal of a differential amplifier 52. The other FET 52 is connected in shun across the terminals of the secondary winding 44. The control circuit for the FET's include an AC connection to one end of the secondary winding 24 of the power transformer 12 and includes a series resistor 54 connected to the base electrode of a PNP transistor 56, the halfwave rectifier 58 is connected between the base electrode of the transistor 56 and the reference lead 38. The emitter electrode of the transistor 56 is directly connected to the reference lead 38 while the collector electrode thereof is connected through a resistor 60 to the negative supply lead 42. The collector electrode of the transistor 56 is also connected directly to the gate electrode of the FET 50. The collector electrode of the transistor 56 is further connected through a coupling resistor 62 to the base electrode of a second PNP transistor 64. The emitter of the transistor 64 is directly connected to the reference lead 38 while the collector is connected through a resistor 66 to the negative lead 42. The collector of the transistor 64 is also connected through a coupling resistor 68 to the gate electrode of the FET 48. A filter capacitor 70 is connected between the output terminal of the FET 48 and the reference lead 38.

As was previously mentioned, the output of the FET 48 is connected to one input terminal of the amplifier 52. The output of the amplifier 52 is connected to the input of a current controlling amplifier represented by a Darlington pair comprising a first and a second NPN transistors 72 and 74, respectively. The output terminal of the amplifier 52 is connected directly to the base electrode of the transistor 72. The emitter of the transistor 72 is directly connected to the base electrode of the second transistor 74. The collectors of both transistors 72 and 74 are connected together and to an output terminal 76. A second output terminal 78 is directly connected to the positive supply lead 40. A current responsive utilization device 80 has its two input terminals connected, respectively, to the two output terminals 76 and 78. The emitter of the transistor 74 is connected through a load resistor 82 to the reference lead 38. The emitter of the transistor 74 is also connected through a feedback resistor 84 to the other input terminal of the differential amplifier 52.

In operation, power is supplied to the transmiter 2 from the secondary winding 14 of the transformer 12 and rectified by the rectifier bridge 16. Thus, direct current energy appears on the transmission leads 6. As the primary sensor, represented by the thermocouple 4, senses a process variable, the magnitude of a current flowing in the leads 6 varies proportionally to the magnitude of the process variable. As shown in the aforementioned Hurd U.S. Pat. No. 3,562,729, the transmission lines 6 carry both the energizing current for the transmitter as well as the signal transmitted thereby. Inasmuch as all of the current carried by the transmission lines 6 is derived through the rectifier bridge 16 from the power supply transformer secondary winding 14, the alternating current in the AC portion of the power supply network also varies directly with the transmitted signal. The transformer 20 comprises a current transformer and produces a AC signal in the secondary 44 which is proportional to the current in the AC portion of the transmiter power supply. The current signal in the secondary 44 is converted to a voltage signal by the resistor 46. The transistor 56 and 64 are alternately triggered to a conductive stage by the half-wave rectified signal applied to the base of the transistor 56, the alternate pulsing of the transistors 56 and 64 similarly triggers the FET's 50 and 48 into alternate conduction. The alternate triggering of the two FET's together with the filter capacitor 70 produces a DC signal at the input terminal of the amplifier 52 which is proportional to the magnitude of the voltage signal developed across the resistor 46. The voltage developed across the resistor 46 is, in turn, proportional to the signal developed in and transmited by the transmistter 2. Thus, the DC signal produced at the input terminal of the amplifier 52 is proportional to the process variable signal developed and transmitted by the transmitter 2.

The output signal from the amplifier 52 is applied as input signal to the Darlington pair, transistors 72 and 74. It will be noted that the conductivity path of the Darlington pair is included in a series circuit between the positive supply lead 40 and the reference lead 38; that series circuit also includes the utilization device 80 and the load resistor 82. The current flowing in that series circuit produces a feedback voltage signal across the resistor 82 which is applied, through a scaling resistor 84, to the other input terminal of the amplifier 52. This arrangement results in the combination of the amplifier 52 and the Darlington 72, 74 being configured as an operational amplifier. As such, the potential across the input terminals is held at substantially zero volts. Therefore, the current flowing in the aforementioned series circuit must be such as to develop a feedback signal across the resistor 82 which is equal to the intelligence signal applied to the first mentioned input terminal of the amplifier 52. Accordingly, it is clear that the magnitude of the current flowing in the aforementioned series, or output, circuit is a direct function of the magnitude of the process variable signal devloped and transmitted by the tramsitter 2.

Figure 2:
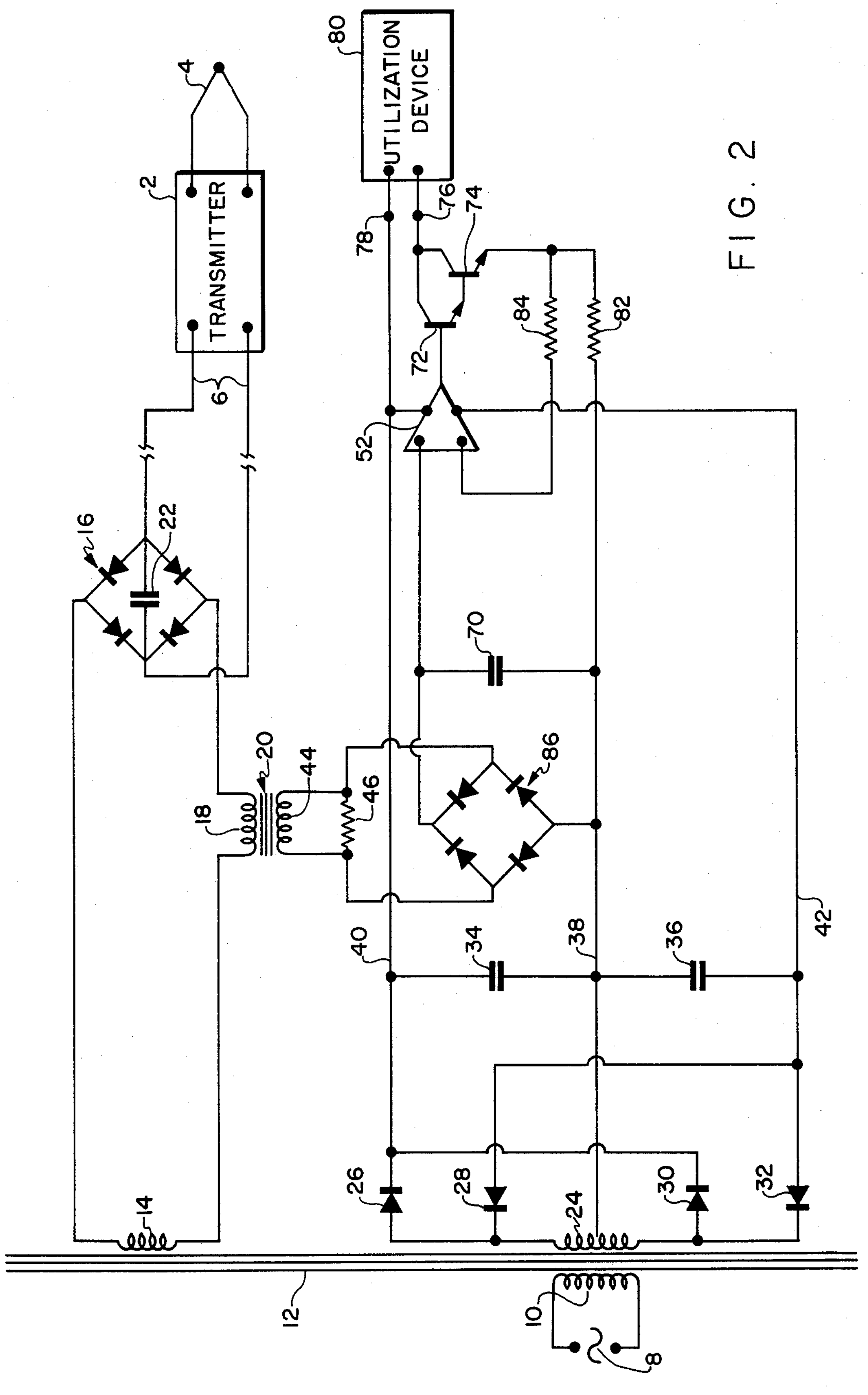
FIG. 2 is a schematic diagram of a different embodiment of the present invention.

In FIG. 2 there is shown a very similar circuit also embodying the prsent invention. In that llustration those ocmponents which are identical to those shown in FIG. 1 have been identified with the same reference numerals as the corresponding parts in FIG. 1. The primary difference between the circuit illustrated in FIG. 2 and that shown in FIG. 1 is that the synchrnous demodulator illustrated in FIG. 1 has been replaced by a simple passive rectifier bridge 86. The essential operation of both circuits is the same. In both circuits, the AC signal developed across the resistor 46 is demodulated, converted to a corresponding DC signal and applied to the input of the amplifier 52.

The system as herein shown and described provides a data transmission system wherein the transducer/-transmitter is conductively isolated from a power supply ground as well as being conductively isolated from the ouput or utilization appartus.

Thus, there has been provided, in accordance with the present invention, an improved, isolated two-wire transmission system which avoids the need for an oscillatory means at the transmitter station.

The embodiments of the invention in which an exclusive property or privelege is claimed are defined as follows:

1. An isolator means for a signal transducer/transmitter system wherein a transducer/transmitter is connected to a control station by a two-wire transmission line and wherein all of the energizing current for said transducer/transmitter as well as the intelligence signals from said transducer/transmitter is carried by said two-wire transmission line, said isolator means comprising:

a power transformer having a primary winding suitable for connection to an AC energy source and a secondary winding connected in an energizing circuit for said transducer/transmitter;

said energizing circuit including a current rectifying means for converting AC energy from said power transformer to DC energy for said transducer/-transmitter thereby defining an AC portion and a DC portion of said energizing circuit;

a current transformer having a primary winding serially connected in said AC portion of said energizing circuit;

a signal translation circuit including an operational amplifier and output circuit means for connection to a utilization device;

a secondary winding on said current transformer, and demodulator means connected between said last mentioned secondary winding and the input of said operational amplifier.

2. The invention set forth in claim 1 wherein said demodulator means includes a synchronous demodulator.

3. The invention set forth in claim 2 wherein said synchronous demodulator includes a first field effect transistor serially connected between said secondary winding of said current transformer and an input terminal of said operational amplifier, a seocnd field effect transistor connected in shunt across the terminals of said last mentioned secondary winding, and means for rendering said field effect transistors alternately conductive.

4. Theinvention set forth in claim 1 wherein said demodulator means includes a passive rectification means.

* * * * *